US012663833B2

(12) United States Patent
Zhao

(10) Patent No.: US 12,663,833 B2
(45) Date of Patent: Jun. 23, 2026

(54) SUPPORT LAYER, FLEXIBLE DISPLAY MODULE AND FLEXIBLE DISPLAY DEVICE

(71) Applicants: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

(72) Inventor: Yuan Zhao, Wuhan (CN)

(73) Assignees: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 1194 days.

(21) Appl. No.: 17/440,749

(22) PCT Filed: Jul. 19, 2021

(86) PCT No.: PCT/CN2021/107159
§ 371 (c)(1),
(2) Date: Dec. 29, 2022

(87) PCT Pub. No.: WO2022/267121
PCT Pub. Date: Dec. 29, 2022

(65) Prior Publication Data
US 2024/0028078 A1     Jan. 25, 2024

(30) Foreign Application Priority Data

Jun. 23, 2021   (CN) .......................... 202110697528.9

(51) Int. Cl.
*G06F 1/16* (2006.01)

(52) U.S. Cl.
CPC .... *G06F 1/1652* (2013.01); *G06F 2200/1613* (2013.01)

(58) Field of Classification Search
None
See application file for complete search history.

(56) References Cited

U.S. PATENT DOCUMENTS 4,292,376 A * 9/1981 Hustler ................... F23R 3/002
                                                          428/596
2018/0097197 A1 * 4/2018 Han ......................... H05K 5/03
(Continued)

FOREIGN PATENT DOCUMENTS

CN      106229310 A    12/2016
CN      107424520 A    12/2017
(Continued)

OTHER PUBLICATIONS

International Search Report in International application No. PCT/CN2021/107159, mailed on Mar. 22, 2022.
(Continued)

*Primary Examiner* — Seth Dumbris
(74) *Attorney, Agent, or Firm* — PV IP PC; Peter Stecher; Wei Te Chung

(57) ABSTRACT

Disclosed are a support layer, a flexible display module and a flexible display device. The support layer comprises a first steel sheet layer and N second steel sheet layers laminated on one surface of the first steel sheet layer, N is a positive integer; a groove is provided on the surface of the first steel sheet layer facing the second steel sheet layers, and a part of any of the second steel sheet layers corresponding to the
(Continued)

groove is provided with a through hole, and a cross-sectional width of the through hole is greater than a cross-sectional width of the groove.

20 Claims, 4 Drawing Sheets

(56) References Cited

U.S. PATENT DOCUMENTS

| | | | | | |
|---|---|---|---|---|---|
| 2019/0288298 | A1* | 9/2019 | Suzuki | .................... | B32B 9/046 |
| 2020/0185641 | A1 | 6/2020 | Jeong et al. | | |
| 2021/0168929 | A1* | 6/2021 | Wang | .................... | H05K 1/028 |
| 2021/0335840 | A1* | 10/2021 | Qin | ........................ | H10D 86/60 |

FOREIGN PATENT DOCUMENTS

| | | | | | |
|---|---|---|---|---|---|
| CN | 208141720 | U | 11/2018 | | |
| CN | 109671718 | A | 4/2019 | | |
| CN | 109903679 | A | 6/2019 | | |
| CN | 110767098 | A | 2/2020 | | |
| CN | 111312794 | A | 6/2020 | | |
| CN | 111768701 | A | 10/2020 | | |
| CN | 112863362 | A | 5/2021 | | |
| KR | 20190003257 | A | 1/2019 | | |
| KR | 20200114111 | A | 10/2020 | | |
| WO | 2019030891 | A1 | 2/2019 | | |
| WO | WO-2020113736 | A1 * | 6/2020 | ............ | G09F 9/301 |

OTHER PUBLICATIONS

Written Opinion of the International Searching Authority in International application No. CN2021/107159, mailed on Mar. 22, 2022.
Chinese Office Action in corresponding Chinese Patent Application No. 202110697528.9 dated Jan. 19, 2022, pp. 1-8.

* cited by examiner

1

SUPPORT LAYER, FLEXIBLE DISPLAY MODULE AND FLEXIBLE DISPLAY DEVICE

CROSS-REFERENCE TO RELATED APPLICATIONS

This application is a National Phase of PCT Patent Application No. PCT/CN2021/107159 having international filing date of Jul. 19, 2021, which claims the benefit of priority of Chinese Patent Application No. 202110697528.9 filed on Jun. 23, 2021. The contents of the above applications are all incorporated by reference as if fully set forth herein in their entirety.

FIELD OF THE INVENTION

The present application relates to a display technology field, and more particularly to a support layer, a flexible display module and a flexible display device.

BACKGROUND OF THE INVENTION

With the continuous development of display technology, flexible display panels have become one of the most potential developing directions. Flexible display panels include multiple folding forms, such as vertically inward bending, horizontally outward bending, and horizontally inward bending. The module material of the flexible display panel is mainly polymer film material. Compared with the traditional display panel with glass as the cover, the overall stiffness and flatness are poor, which influence the user's hand touching sense.

In order to enhance the overall stiffness of the flexible display panel, steel sheets are generally added to the module material as a support layer. However, after the flexible display panel needs to be bent up to 200,000 times, the screen must still be kept in good condition without problems such as film breakage or peeling. Due to the poor bending of the steel sheet itself, after being added in the module, the entire flexible display module is prone to many problems, such as steel sheet fracture and poor display. Therefore, there is a need to improve this defect.

SUMMARY OF THE INVENTION

The present application provides a support layer, which is employed to solve the technical problem that the support layer in the prior art utilizes steel sheets to improve the overall stiffness, but the steel sheets possess poor bending properties and are prone to breakage of the steel sheets.

The embodiment of the present application provides a support layer, comprising a first steel sheet layer and N second steel sheet layers laminated on one surface of the first steel sheet layer, N is a positive integer; a groove is provided on the surface of the first steel sheet layer facing the second steel sheet layers, and a part of any of the second steel sheet layers corresponding to the groove is provided with a through hole, and a cross-sectional width of the through hole is greater than a cross-sectional width of the groove.

In the support layer provided by the embodiment of the present application, a central axis of the groove coincides with a central axis of any of the through holes.

In the support layer provided by the embodiment of the present application, as N is a positive integer greater than 1, the cross-sectional widths of the through holes in the second steel sheet layers gradually increase in a direction away from the groove.

In the support layer provided by the embodiment of the present application, a thickness of the support layer is greater than or equal to 100 micrometers and less than or equal to 200 micrometers.

In the support layer provided by the embodiment of the present application, a thickness of the first steel sheet layer and any of the second steel sheet layers is greater than or equal to 5 micrometers and less than or equal to 50 micrometers.

In the support layer provided by the embodiment of the present application, a longitudinal cross-sectional shape of the groove is rectangular, trapezoidal, semi-rounded rectangular, semi-circular or semi-elliptical, and a cross-sectional width of a bottom of the groove is less than or equal to a cross-sectional width of a top of the groove.

In the support layer provided by the embodiment of the present application, a longitudinal cross-sectional shape of the through hole is rectangular, trapezoidal or semi-rounded rectangular, and a cross-sectional width of a side of the through hole close to the groove is less than or equal to a cross-sectional width of a side of the through hole away from the groove.

In the support layer provided by the embodiment of the present application, both the groove and the through hole are provided with a filling layer, and a material of the filling layer is thermoplastic polyurethane elastomer rubber or solid rubber.

The embodiment of the present application provides a flexible display module, comprising: a display panel and a support layer, the display panel comprises a bending area and a non-bending area located on both sides of the bending area, and the support layer is arranged on an opposite side of a display surface of the display panel, and the support layer comprises a first steel sheet layer and N second steel sheet layers laminated on one surface of the first steel sheet layer, N is a positive integer, and a groove is provided on the surface of the first steel sheet layer facing the second steel sheet layers, and a part of any of the second steel sheet layers corresponding to the groove is provided with a through hole, and a cross-sectional width of the through hole is greater than a cross-sectional width of the groove; wherein the groove of the support layer is arranged corresponding to the bending area, and an opening direction of the groove is consistent with a bending direction of the flexible display module.

In the flexible display module provided by the embodiment of the present application, a cross-sectional width of the through hole in the second steel sheet layer close to the bending direction of the flexible display module in the support layer is equal to a cross-sectional width of the bending area.

In the flexible display module provided by the embodiment of the present application, a central axis of the groove, a central axis of any of the through holes and a central axis of the bending area coincide.

In the flexible display module provided by the embodiment of the present application, as N is a positive integer greater than 1, the cross-sectional widths of the through holes in the second steel sheet layers gradually increase in a direction away from the groove.

In the flexible display module provided by the embodiment of the present application, a thickness of the support layer is greater than or equal to 100 micrometers and less than or equal to 200 micrometers.

In the flexible display module provided by the embodiment of the present application, a thickness of the first steel sheet layer and any of the second steel sheet layers is greater than or equal to 5 micrometers and less than or equal to 50 micrometers.

In the flexible display module provided by the embodiment of the present application, a longitudinal cross-sectional shape of the groove is rectangular, trapezoidal, semi-rounded rectangular, semi-circular or semi-elliptical, and a cross-sectional width of a bottom of the groove is less than or equal to a cross-sectional width of a top of the groove.

In the flexible display module provided by the embodiment of the present application, a longitudinal cross-sectional shape of the through hole is rectangular, trapezoidal or semi-rounded rectangular, and a cross-sectional width of a side of the through hole close to the groove is less than or equal to a cross-sectional width of a side of the through hole away from the groove.

In the flexible display module provided by the embodiment of the present application, both the groove and the through hole are provided with a filling layer, and a material of the filling layer is thermoplastic polyurethane elastomer rubber or solid rubber.

The embodiment of the present application further provides a flexible display device, comprising a driving chip and a flexible display module, and the flexible display module comprises a display panel and a support layer, the display panel comprises a bending area and a non-bending area located on both sides of the bending area, and the support layer is arranged on an opposite side of a display surface of the display panel, and the support layer comprises a first steel sheet layer and N second steel sheet layers laminated on one surface of the first steel sheet layer, N is a positive integer, and a groove is provided on the surface of the first steel sheet layer facing the second steel sheet layers, and a part of any of the second steel sheet layers corresponding to the groove is provided with a through hole, and a cross-sectional width of the through hole is greater than a cross-sectional width of the groove; wherein the groove of the support layer is arranged corresponding to the bending area, and an opening direction of the groove is consistent with a bending direction of the flexible display module.

In the flexible display device provided by the embodiment of the present application, a central axis of the groove, a central axis of any of the through holes and a central axis of the bending area coincide.

In the flexible display device provided by the embodiment of the present application, as N is a positive integer greater than 1, the cross-sectional widths of the through holes in the second steel sheet layers gradually increase in a direction away from the groove.

The present application provides a support layer, comprising a first steel sheet layer and N second steel sheet layers laminated on one surface of the first steel sheet layer, N is a positive integer; a groove is provided on the surface of the first steel sheet layer facing the second steel sheet layers, and a part of any of the second steel sheet layers corresponding to the groove is provided with a through hole, and a cross-sectional width of the through hole is greater than a cross-sectional width of the groove. The present application divides the support layer into a first steel sheet layer and N second steel sheet layers laminated on one side surface of the first steel sheet layer, and on the side of the first steel sheet layer facing the second steel sheet layer, a groove is provided on the surface, a through hole is provided in the part of any of the second steel sheet layers corresponding to the groove, and a cross-sectional width of the through hole is greater than a cross-sectional width of the groove, wherein the accommodating space formed by the combination of the through hole and the groove can effectively avoid stress concentration generated during the bending procedure, thereby improving the bending performance of the support layer and improving the bending performance and stiffness of the flexible display module.

DETAILED DESCRIPTION OF PREFERRED EMBODIMENTS

Figure 1:
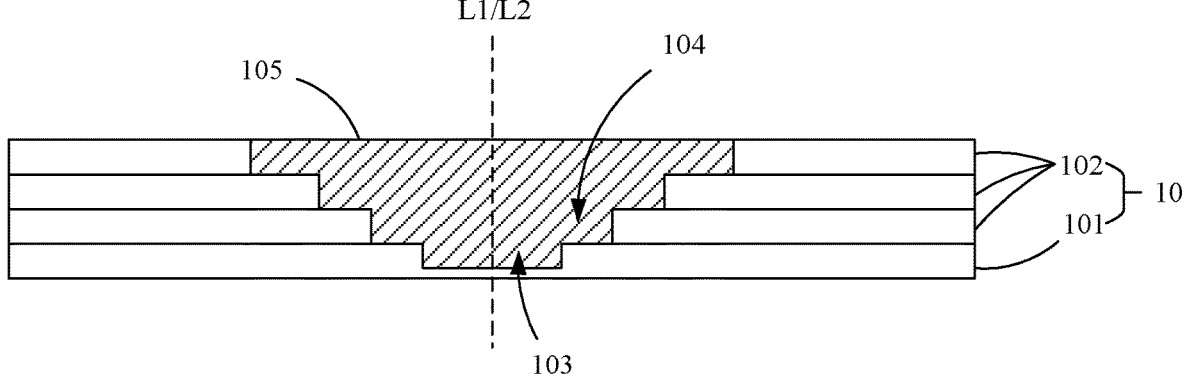
FIG. 1 is a schematic diagram of the basic structure of a support layer provided by an embodiment of the application.

For the purpose, technical solutions and advantages of the present application will become clear, unambiguous, embodiments of the present application is described in further detail below with reference to the accompanying drawings simultaneously. In drawings, for clarity and ease of understanding and description, the sizes and the thicknesses of the components shown in the drawings are not to scale.

Figure 2:
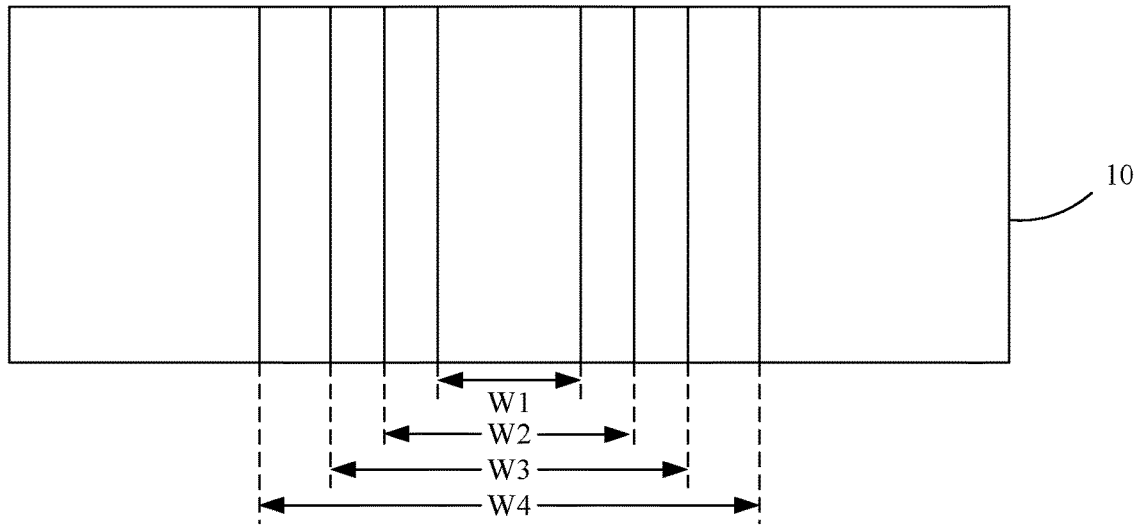
FIG. 2 is a top view of a support layer provided by an embodiment of the application.

As shown in FIG. 1 and FIG. 2, which are a schematic diagram of the basic structure of a support layer provided by an embodiment of the application and a top view of a support layer provided by an embodiment of the application. The support layer 10 comprises a first steel sheet layer 101 and N second steel sheet layers 102 laminated on one surface of the first steel sheet layer 101, N is a positive integer; wherein a groove 103 is provided on the surface of the first steel sheet layer 101 facing the second steel sheet layers 102, and a part of any of the second steel sheet layers 102 corresponding to the groove 103 is provided with a through hole 104, and a cross-sectional width of the through hole 104 is greater than a cross-sectional width of the groove 103.

It is understandable that the material of the flexible display module is mainly polymer film material, and the overall stiffness and flatness are poor. The support layer is used to support the flexible display module to improve the stiffness and flatness of the flexible display module. In the prior art, steel sheets are used as the material of the support layer, but due to the poor bending performance of the steel sheets, stress concentration may easily occur during the bending procedure, which may cause the steel sheets to break, resulting in the yield decrease of the flexible display module. The present application divides the support layer 10 into a first steel sheet layer 101 and N second steel sheet layers 102 laminated on one side surface of the first steel sheet layer 101, and on the side of the first steel sheet layer 101 facing the second steel sheet layer 102, a groove 103 is provided on the surface, a through hole 104 is provided in a part of any of the second steel sheet layers 102 corresponding to the groove 103, and a cross-sectional width of the through hole 104 is greater than a cross-sectional width of the groove 103, wherein the accommodating space formed by the combination of the through hole 104 and the groove 103 can effectively avoid stress concentration generated during the bending procedure, thereby improving the bending performance of the support layer 10 and improving the bending performance and stiffness of the flexible display module.

Specifically, N may be 1 or a positive integer greater than 1. When N is 1, the support layer 10 comprises a first steel sheet layer 101 and a second steel sheet layer 102; when N is a positive integer greater than 1, the support layer 10 comprises a first steel sheet layer 101 and a plurality of second steel sheet layers 102.

The first steel sheet layer 101 and the second steel sheet layer 102, and/or the second steel sheet layer 102 and the second steel sheet layer 102 are fixed by an adhesive layer (not shown), and the adhesive layer has extremely high viscosity, and its adhesive force is greater than 0.6 N/mm. The glass transition temperature is less than minus 10 degrees Celsius, the storage modulus under minus 20 degrees Celsius is less than 2×105 Pa, and the storage modulus at room temperature is less than 5×104 Pa and a certain shear performance remains. The recovery is greater than 80% under minus 20 degrees Celsius, and the recovery is greater than 90% under 70 degrees Celsius. In the embodiment of the present application, the first steel sheet layer 101 and the second steel sheet layer 102 are fixed by the adhesive layer with extremely high viscosity, so that the peeling of the film layer can be avoided.

Specifically, that the through hole 104 is provided in a part of any of the second steel sheet layers 102 corresponding to the groove 103, and the cross-sectional width of the through hole 104 is greater than the cross-sectional width of the groove 103 refers to: an orthographic projection of the groove 103 on the second steel sheet layer 102 falls within the through hole 104, that is, an opening of the groove 103 is completely communicated with the through hole 104.

Specifically, a bending direction of the support layer 10 is consistent with an opening direction of the groove 103, that is, the support layer 10 needs to be bent toward the opening direction of the groove 103. As shown in FIG. 1, the opening direction of the groove 103 is upward, the support layer 10 needs to bend both the left and right sides upward at the same time. During the bending procedure, the left and right sides are squeezed toward the middle. Since there are grooves 103 and the plurality of through holes 104 in the middle, there is redundant space in the middle to provide avoidance for the support layers 10 on the left and right sides. In the embodiment of the present application, the steel sheet material in the area of the groove 103 and the through hole 104 is etched away, which can prevent the steel sheets in the middle area from being broken due to excessive bending stress. Therefore, the bending performance of the support layer 10 is improved.

In one embodiment, a central axis L1 of the groove 103 coincides with a central axis L2 of any of the through holes 104. It can be understood that the central axis refers to the symmetrical distribution of the graphics on both sides of the central axis. Therefore, a symmetry axis of the groove 103 coincides with a symmetry axis of the through hole 104. When the support layer 10 is bent, the structures on the left and right sides of the support layer 10 are highly symmetrical, and the bending stresses are relatively balanced, and it is not easy to cause a single-sided bending stress to break.

In one embodiment, as N is a positive integer greater than 1, the cross-sectional widths of the through holes 104 in the second steel sheet layers 102 gradually increase in a direction away from the groove 103. As shown in FIG. 1 and FIG. 2, in this embodiment, a first steel sheet layer 101 and three second steel sheet layers 102 are illustrated for description. The cross-sectional width of the groove 103 in FIG. 1 corresponds to W1 in FIG. 2, and the cross-sectional widths of the through holes 104 in FIG. 2 correspond to W2, W3 and W4 in FIG. 2. It can be seen obviously in FIG. 1 and FIG. 2 that W1<W2<W3<W4, that is, the cross-sectional widths W2, W3, W4 of the through holes 104 in the second steel sheet layer 102 gradually increase in the direction away from the groove 103. Namely, the first steel sheet layer 101 and the plurality of second steel sheet layers 102 form a stepped arrangement, i.e., the accommodating space formed by the groove 103 and the through holes 104 continuously widens along the bending direction, that is, the redundant space of the support layer 10 along the bending direction continuously increases, which is not only more conducive to bending, but also possesses good stability.

In one embodiment, a thickness of the support layer 10 is greater than or equal to 100 micrometers and less than or equal to 200 micrometers, for example, 150 micrometers. A thickness of the first steel sheet layer 101 and any of the second steel sheet layers 102 is greater than or equal to 5 micrometers and less than or equal to micrometers. The number of the second steel sheet layer 102 is not limited, as long as the overall thickness of the first steel sheet layer 101 and the second steel sheet layer 102 is within the thickness range of the support layer 10. In the embodiment of the present application, the entire steel sheet layer of the prior art is divided into a plurality of ultra-thin steel sheet which are laminated, and a stepped accommodating space is provided in the middle of the plurality of ultra-thin steel sheet laminated, which can enhance the overall bending performance, to avoid bending fracture caused by poor bending of the steel sheet.

In one embodiment, both the groove 103 and the through hole 104 are provided with a filling layer 105, and a material of the filling layer 105 is thermoplastic polyurethane elastomer rubber or solid rubber. In the embodiment of the present application, by providing a filling layer 105 in the groove 103 and the through holes 104, it is possible to prevent the support layer 10 from being partially recessed and causing imprints on the surface of the flexible display module. Moreover, the material of the filling layer 105 is a deformable material, which can absorb the bending stress generated by the steel sheet material during the bending procedure, and can avoid the steel sheet from bending and breaking.

In this embodiment, the longitudinal cross-sectional shape of the groove 103 is rectangular, and the longitudinal cross-sectional shape of the through hole 104 is rectangular. In other embodiments, a longitudinal cross-sectional shape of the groove 103 may be selected from being rectangular, trapezoidal, semi-rounded rectangular, semi-circular or semi-elliptical, and a cross-sectional width of a bottom of the groove 103 is less than or equal to a cross-sectional width of a top of the groove 103. That is, a cross-sectional width of a side of the groove 103 away from the through hole 104 is less than or equal to a cross-sectional width of a side of the groove 103 close to the through hole 104. The longitudinal cross-sectional shape of the through hole 104 can also be a trapezoid or a semi-rounded rectangle, and a cross-sectional width of a side of the through hole 104 close to the groove 103 is less than or equal to a cross-sectional width of a side of the through hole 104 away from the groove 103. It should be noted that the longitudinal cross-section refers to a plane perpendicular to the plane where the support layer 10 is located.

Figure 3A:
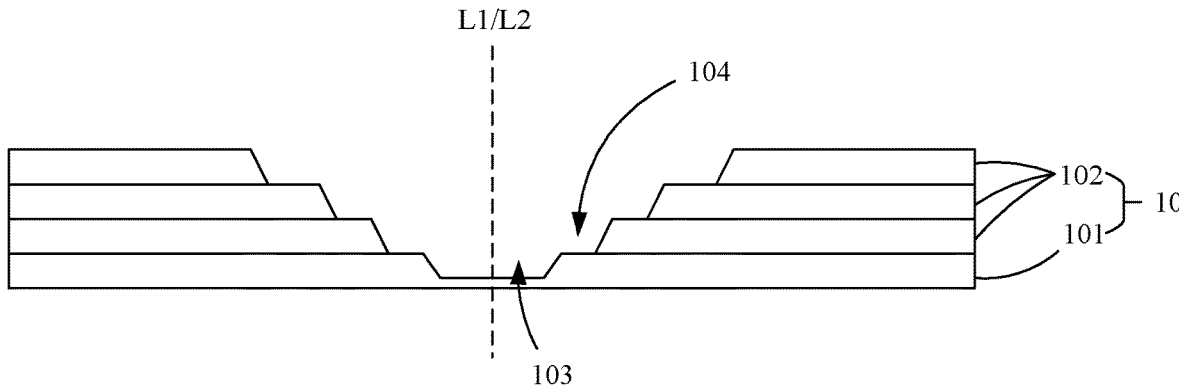
FIG. 3a is a schematic diagram of the basic structure of another support layer provided by an embodiment of the application.

Next, please refer to FIG. 3a, which is a schematic diagram of the basic structure of one another support layer provided by another embodiment of the application. The support layer 10 comprises a first steel sheet layer 101 and N second steel sheet layers 102 laminated on one surface of the first steel sheet layer 101, N is a positive integer; wherein a groove 103 is provided on the surface of the first steel sheet layer 101 facing the second steel sheet layers 102, and a part of any of the second steel sheet layers 102 corresponding to the groove 103 is provided with a through hole 104, and a cross-sectional width of the through hole 104 is greater than a cross-sectional width of the groove 103.

In this embodiment, the longitudinal cross-sectional shape of the groove 103 is trapezoidal, and the cross-sectional width of the bottom of the groove 103 is less than the cross-sectional width of the top of the groove 103. The longitudinal cross-sectional shape of the through hole 104 is trapezoidal, and a cross-sectional width of a side of the through hole 104 close to the groove 103 is less than or equal to a cross-sectional width of a side of the through hole 104 away from the groove 103. In this embodiment, the side-walls of the groove 103 and the through holes 104 are both sloped, which can further reduce the bending stress of the support layer 10.

In one embodiment, a central axis L1 of the groove 103 coincides with a central axis L2 of any of the through holes 104. It can be understood that the central axis refers to the symmetrical distribution of the graphics on both sides of the central axis. Therefore, a symmetry axis of the groove 103 coincides with a symmetry axis of the through hole 104. When the support layer 10 is bent, the structures on the left and right sides of the support layer 10 are highly symmetrical, and the bending stresses are relatively balanced, and it is not easy to cause a single-sided bending stress to break.

Figure 3B:
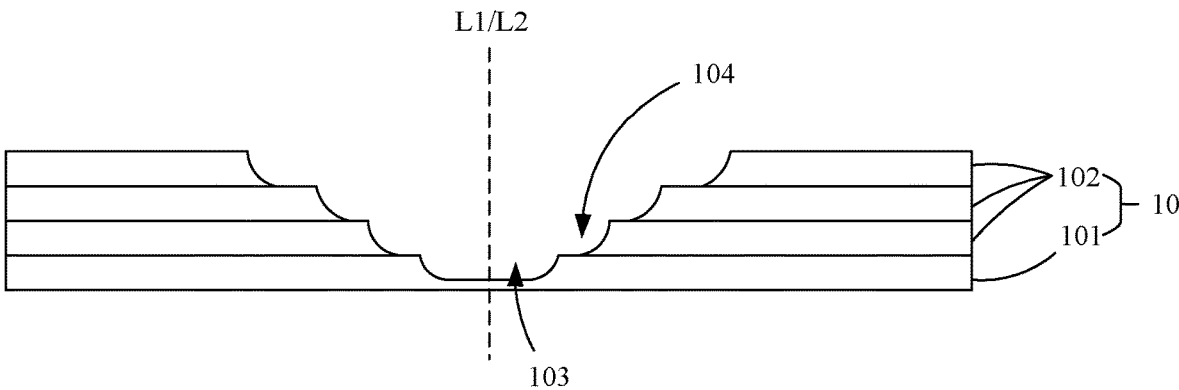
FIG. 3b is a schematic diagram of the basic structure of one another support layer provided by an embodiment of the application.

Next, please refer to FIG. 3b, which is a schematic diagram of the basic structure of one another support layer provided by an embodiment of the application. The support layer 10 comprises a first steel sheet layer 101 and N second steel sheet layers 102 laminated on one surface of the first steel sheet layer 101, N is a positive integer; wherein a groove 103 is provided on the surface of the first steel sheet layer 101 facing the second steel sheet layers 102, and a part of any of the second steel sheet layers 102 corresponding to the groove 103 is provided with a through hole 104, and a cross-sectional width of the through hole 104 is greater than a cross-sectional width of the groove 103.

In this embodiment, the longitudinal cross-sectional shape of the groove 103 is semi-rounded rectangular, and the cross-sectional width of the bottom of the groove 103 is less than the cross-sectional width of the top of the groove 103. The longitudinal cross-sectional shape of the through hole 104 is semi-rounded rectangular, and a cross-sectional width of a side of the through hole 104 close to the groove 103 is less than or equal to a cross-sectional width of a side of the through hole 104 away from the groove 103. In this embodiment, the sidewalls of the groove 103 and the through holes 104 are both smooth arcs, which can further reduce the bending stress of the support layer 10.

In one embodiment, a central axis L1 of the groove 103 coincides with a central axis L2 of any of the through holes 104. It can be understood that the central axis refers to the symmetrical distribution of the graphics on both sides of the central axis. Therefore, a symmetry axis of the groove 103 coincides with a symmetry axis of the through hole 104. When the support layer 10 is bent, the structures on the left and right sides of the support layer 10 are highly symmetrical, and the bending stresses are relatively balanced, and it is not easy to cause a single-sided bending stress to break.

Figure 3C:
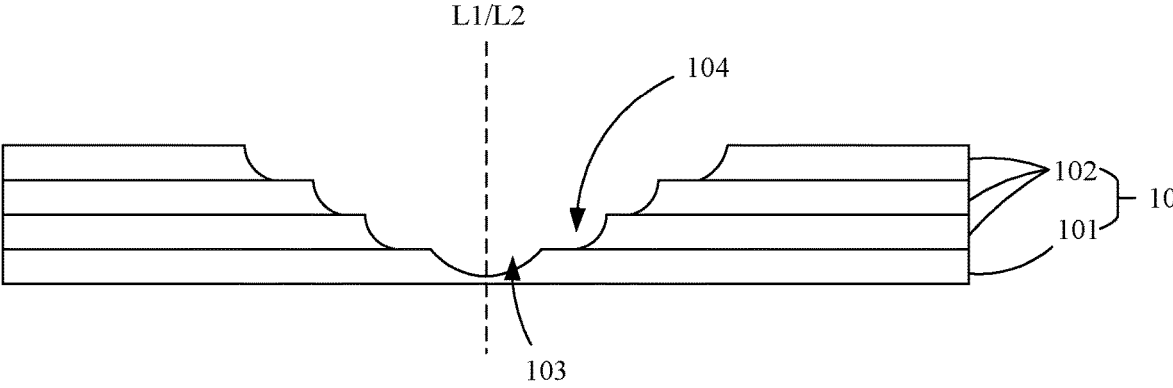
FIG. 3c is a schematic diagram of the basic structure of one another support layer provided by an embodiment of the application.

Next, please refer to FIG. 3c, which is a schematic diagram of the basic structure of one another support layer provided by an embodiment of the application. The support layer 10 comprises a first steel sheet layer 101 and N second steel sheet layers 102 laminated on one surface of the first steel sheet layer 101, N is a positive integer; wherein a groove 103 is provided on the surface of the first steel sheet layer 101 facing the second steel sheet layers 102, and a part of any of the second steel sheet layers 102 corresponding to the groove 103 is provided with a through hole 104, and a cross-sectional width of the through hole 104 is greater than a cross-sectional width of the groove 103.

In this embodiment, the longitudinal cross-sectional shape of the groove 103 is semi-elliptical, and the cross-sectional width of the bottom of the groove 103 is less than the cross-sectional width of the top of the groove 103. The longitudinal cross-sectional shape of the through hole 104 is semi-elliptical, and a cross-sectional width of a side of the through hole 104 close to the groove 103 is less than or equal to a cross-sectional width of a side of the through hole 104 away from the groove 103. In this embodiment, the side-walls of the groove 103 and the through holes 104 and the bottom of the groove 103 are all smooth arcs, which can further reduce the bending stress of the support layer 10.

In one embodiment, a central axis L1 of the groove 103 coincides with a central axis L2 of any of the through holes 104. It can be understood that the central axis refers to the symmetrical distribution of the graphics on both sides of the central axis. Therefore, a symmetry axis of the groove 103 coincides with a symmetry axis of the through hole 104. When the support layer 10 is bent, the structures on the left and right sides of the support layer 10 are highly symmetrical, and the bending stresses are relatively balanced, and it is not easy to cause a single-sided bending stress to break.

Figure 4A:
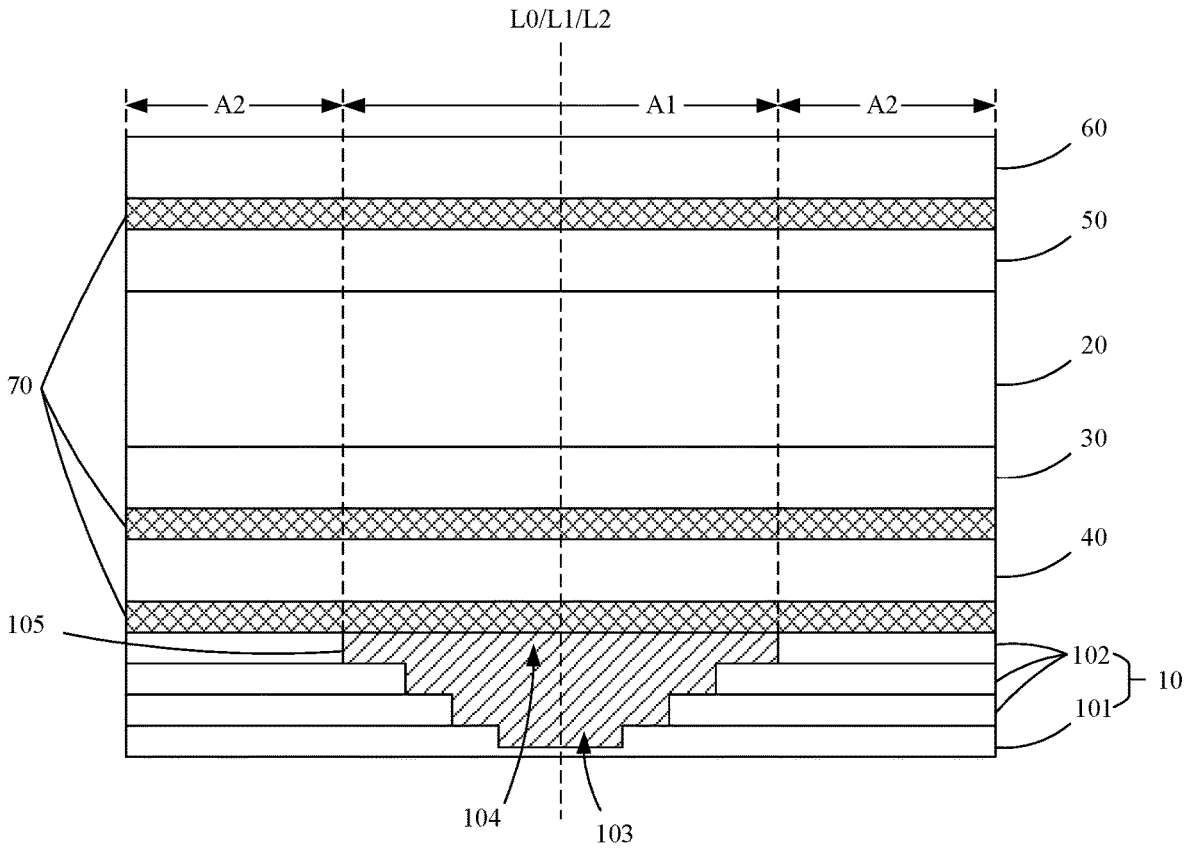
FIG. 4a is a schematic diagram of the basic structure of a flexible display module provided by an embodiment of the application.

Next, please refer to FIG. 4a, which is a schematic diagram of the basic structure of a flexible display module provided by an embodiment of the application. The flexible display module comprises a display panel 20 and a support layer 10. The display panel 20 comprises a bending area A1 and a non-bending area A2 located on both sides of the bending area A1. The support layer 10 comprises a first steel sheet layer 101 and N second steel sheet layers 102 laminated on one surface of the first steel sheet layer 101, N is a positive integer. A groove 103 is provided on the surface of the first steel sheet layer 101 facing the second steel sheet layers 102, and a part of any of the second steel sheet layers 102 corresponding to the groove 103 is provided with a through hole 104, and a cross-sectional width of the through hole 104 is greater than a cross-sectional width of the groove 103. The support layer 10 is arranged on an opposite side of a display surface of the display panel 20. The groove 103 of the support layer 10 is arranged corresponding to the bending area A1, and an opening direction of the groove 103 is consistent with a bending direction of the flexible display module.

It should be noted that, for the structure of the support layer 10, please refer to FIG. 1 to FIG. 3c and related descriptions. The display surface of the display panel refers to the light emitting side of the display panel 20, that is, the side on which the user can receive information. It can be defined as the top side of the display panel and the support layer 10 is located on the bottom side of the display panel 20.

The bending direction of the flexible display module may bend both sides to the top and bend both sides to the bottom. As shown in FIG. 4a, when the bending direction of the flexible display module is bent from both sides to the top, that is, when the bending direction is upward, the opening direction of the groove 103 is also upward, the second steel sheet layer 102 of the support layer 10 is disposed close to the display panel 20.

Specifically, that the groove 103 of the support layer 10 is arranged corresponding to the bending area A1 refers to that the groove 103 is arranged in the bending area A1, and the through holes 104 are also correspondingly arranged in the bending area A1. Thus, the accommodating space formed by the groove 103 and the through holes 104 is located in the bending area A1, which can improve the overall bending performance of the flexible display module.

In one embodiment, a cross-sectional width of the through hole 104 in the second steel sheet layer 102 close to the bending direction of the flexible display module in the support layer 10 is equal to a cross-sectional width of the bending area A1. It can be understood that the cross-sectional widths of the through holes 104 in the second steel sheet layers 102 continuously increases along the bending direction, the cross-sectional width of the through hole 104 closest to the bending direction is the largest. In the embodiment of the present application, by setting the cross-sectional width of the through hole 104 close to the bending direction to be equal to the cross-sectional width of the bending area A1, the bending performance of the bending area can be maximized without affecting the stiffness of the non-bending area A2.

In one embodiment, a central axis L1 of the groove 103, a central axis L2 of any of the through holes 104 and a central axis L0 of the bending area A1 coincide. It can be understood that the central axis refers to the symmetrical distribution of the graphics on both sides of the central axis. Therefore, a symmetry axis of the groove 103 and a symmetry axis of the through hole 104 coincides with a symmetry axis of the bending area A1. When the flexible display module is bent, the structures on the left and right sides of the central axis L0 of the bending area A1 of the flexible display module are highly symmetrical, and the bending stresses are relatively balanced, and it is not easy to cause a single-sided bending stress to break.

In one embodiment, both the groove 103 and the through hole 104 are provided with a filling layer 105, and a material of the filling layer 105 is thermoplastic polyurethane elastomer rubber or solid rubber. In the embodiment of the present application, by providing a filling layer 105 in the groove 103 and the through holes 104, it is possible to prevent the support layer 10 from being partially recessed and causing imprints on the surface of the flexible display module. Moreover, the material of the filling layer 105 is a deformable material, which can absorb the bending stress generated by the steel sheet material during the bending procedure, and can avoid the steel sheet from bending and breaking.

In one embodiment, the flexible display module further comprises foam 40, a back plate 30, a polarizer 50 and a cover plate 60. The foam 40 is disposed between the display panel 20 and the support layer 10, and the back plate 30 is disposed between the display panel 20 and the foam 40. The foam 40 is fixed to the back plate and the support layer 10 with optical glue 70, respectively. The polarizer 50 is arranged on the side of the display panel 20 away from the back plate 30, the cover plate 60 is arranged on the side of the polarizer 50 away from the display panel 20, and the cover plate 60 is fixed to the polarizer 50 with the optical glue 70.

In one embodiment, the foam 40 is black polyurethane foam, the foam 40 has a thickness of 50-100 micrometers, a density of 0.4-0.8 g/cm3 and an elastic modulus of 0.1-100 Mpa. The foam 40 is provided to avoid unevenness in the bending area A1 on the surface of the flexible display module and can also serve as a buffer. The thickness of the optical glue 70 between the foam 40 and the back plate 30, the support layer 10 is 20-50 micrometers. In some embodiments, the optical glue 70 and the foam may be integrated by coating or bonding, that is, the optical glue 70 and the foam may be integrally formed.

In one embodiment, the back plate 30 is formed by coating a certain thickness of glue on a yellow polyimide film. The polyimide film has a thickness of 20-30 micrometers, and an elastic modulus of 2.0-5.0 Gpa. The thickness of the glue is 20-micrometers, the peeling force on the glass is greater than 2 N/cm, and the storage modulus is 30-50 kpa.

In one embodiment, the display panel 20 comprises an array layer (not shown) on the back plate 30, a light emitting layer (not shown) on the array layer, an encapsulation layer (not shown) on the light emitting layer and a touch layer (not shown) on the encapsulation layer. The pattern of the touch layer is directly vapor-deposited on the encapsulation layer. The total thickness of the display panel 20 is 40-micrometers.

In one embodiment, the thickness of the polarizer 50 is 50-80 micrometers, and the polarizer 50 is composed of a phase retarder, a substrate and coating glue.

In one embodiment, the cover plate 60 is composed of a polyimide film, and the thickness of the polyimide film is 50-100 micrometers. In order to enhance the scratch resistance and hardness of the surface of the cover plate 60, a hardening layer (not shown) is further provided on the polyimide film, and the thickness of the hardening layer is 3-20 micrometers. The cover plate 60 provided in this embodiment possesses excellent optical properties, with a transmittance greater than 90%, a haze less than 1%, a yellowness less than 2%, a pencil hardness greater than 2H and anti-friction times greater than 300 times. The surface of the cover plate 60 is also processed with anti-fingerprint treatment, which can enhance the oil stain resistance of the flexible display module. The thickness of the optical glue 70 between the cover plate 60 and the polarizer 50 is 15-50 micrometers, and it has a relatively large peeling force on the cover plate 60 and the polarizer 50.

Figure 4B:
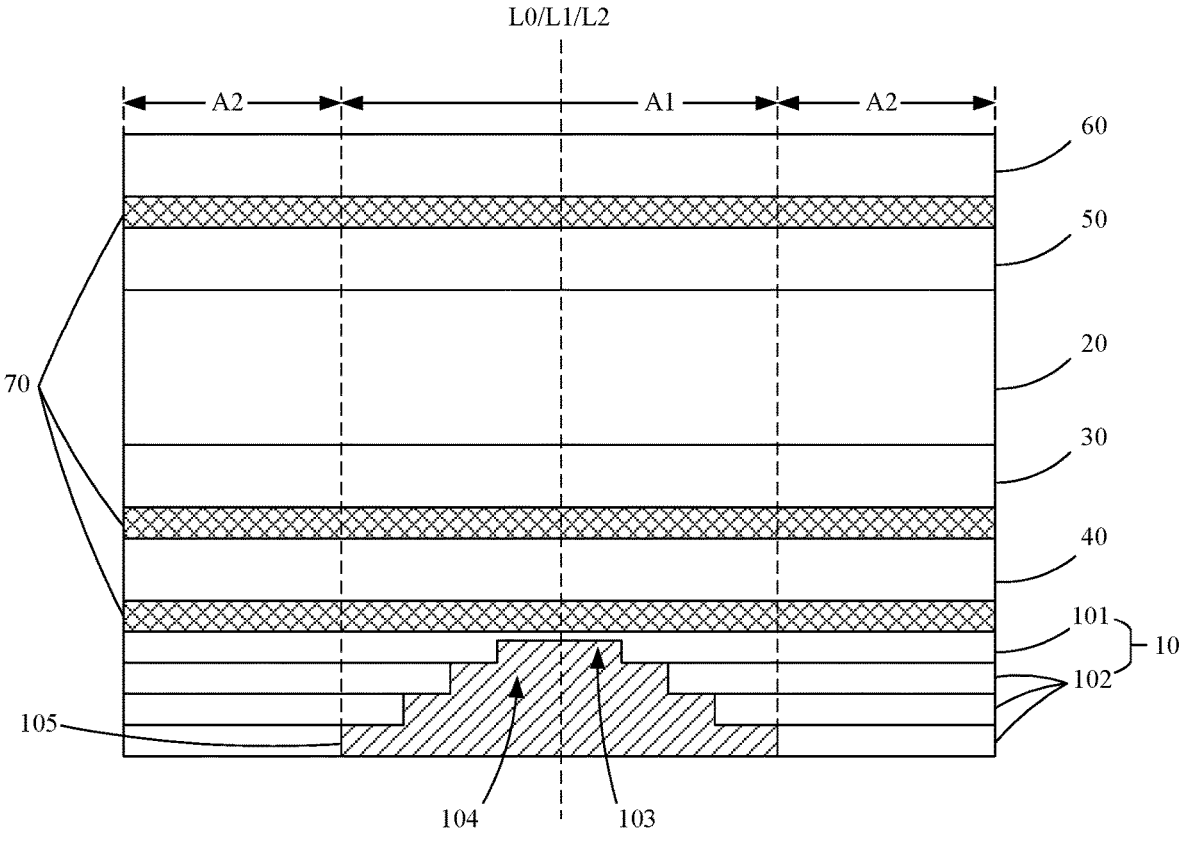
FIG. 4b is a schematic diagram of the basic structure of another flexible display module provided by an embodiment of the application.

Next, please refer to FIG. 4b, which is a schematic diagram of the basic structure of another flexible display module provided by an embodiment of the application. The flexible display module comprises a display panel 20 and a support layer 10. The display panel 20 comprises a bending area A1 and a non-bending area A2 located on both sides of the bending area A1. The support layer 10 comprises a first steel sheet layer 101 and N second steel sheet layers 102 laminated on one surface of the first steel sheet layer 101, N is a positive integer. A groove 103 is provided on the surface of the first steel sheet layer 101 facing the second steel sheet layers 102. A part of any of the second steel sheet layers 102 corresponding to the groove 103 is provided with a through hole 104, and a cross-sectional width of the through hole 104 is greater than a cross-sectional width of the groove 103. The support layer 10 is arranged on an opposite side of a display surface of the display panel 20. The groove 103 of the support layer 10 is arranged corresponding to the bending area A1, and an opening direction of the groove 103 is consistent with a bending direction of the flexible display module.

Specifically, the display surface of the display panel 20 refers to the light emitting side of the display panel 20, that is, the side on which the user can receive information. It can be defined as the top side of the display panel 20, and the support layer 10 is located on the bottom side of the display panel 20. The bending direction of the flexible display module may bend both sides to the top and bend both sides to the bottom. As shown in FIG. 4b, when the bending direction of the flexible display module is bent from both sides to the bottom, that is, when the bending direction is downward, the opening direction of the groove 103 is also downward, The first steel sheet layer 101 of the support layer 10 is disposed close to the display panel 20.

Specifically, that the groove 103 of the support layer 10 is arranged corresponding to the bending area A1 refers to that the groove 103 is arranged in the bending area A1, and the through holes 104 are also correspondingly arranged in the bending area A1. Thus, the accommodating space formed by the groove 103 and the through holes 104 is located in the bending area A1, which can improve the overall bending performance of the flexible display module.

Specifically, in the embodiment of the present application that the flexible display module comprises one bending area A1 is illustrated for description. In other embodiments, the flexible display module may also be provided with multiple bending areas A1, and grooves 103 and through holes 104 may be provided in the support layer 10 in the multiple bending areas A1, as long as the technical solution meets the requirement that the opening direction of the groove 103 is consistent with the bending direction, which should fall within the protection scope of the present application.

The embodiment of the present application further provides a flexible display device, comprising a driving chip and the aforesaid flexible display module. The flexible display device provided by the embodiment of the present application may be a product or component with a display function, such as a mobile phone, a tablet computer, a notebook computer, a digital camera and a navigator.

In conclusion, the embodiment of the present application provides a support layer, comprising a first steel sheet layer and N second steel sheet layers laminated on one surface of the first steel sheet layer, N is a positive integer; a groove is provided on the surface of the first steel sheet layer facing the second steel sheet layers, and a part of any of the second steel sheet layers corresponding to the groove is provided with a through hole, and a cross-sectional width of the through hole is greater than a cross-sectional width of the groove. The present application divides the support layer into a first steel sheet layer and N second steel sheet layers laminated on one side surface of the first steel sheet layer, and on the side of the first steel sheet layer facing the second steel sheet layer, a groove is provided on the surface, a through hole is provided in the part of any of the second steel sheet layers corresponding to the groove, and a cross-sectional width of the through hole is greater than a cross-sectional width of the groove, wherein the accommodating space formed by the combination of the through hole and the groove can effectively avoid stress concentration generated during the bending procedure, thereby improving the bending performance of the support layer and improving the bending performance and stiffness of the flexible display module. It solves the technical problem that the support layer in the prior art utilizes steel sheets to improve the overall stiffness, but the steel sheets possess poor bending properties and are prone to breakage of the steel sheets.

In the foregoing embodiments, the description of the various embodiments have respective different emphases, and a part in some embodiment, which is not described in detail can be referred to the related description of other embodiments.

The present application divides the support layer into a first steel sheet layer and N second steel sheet layers laminated on one side surface of the first steel sheet layer, and on the side of the first steel sheet layer facing the second steel sheet layer, a groove is provided on the surface, a through hole is provided in the part of any of the second steel sheet layers corresponding to the groove, and a cross-sectional width of the through hole is greater than a cross-sectional width of the groove, wherein the accommodating space formed by the combination of the through hole and the groove can effectively avoid stress concentration generated during the bending procedure, thereby improving the bending performance of the support layer and improving the bending performance and stiffness of the flexible display module.

What is claimed is:

1. A support layer, comprising a first steel sheet layer and N second steel sheet layers laminated on one surface of the first steel sheet layer, and N being a positive integer;

wherein a groove is provided on the surface of the first steel sheet layer facing the second steel sheet layers, a part of any of the second steel sheet layers corresponding to the groove is provided with a through hole, a cross-sectional width of the through hole is greater than a cross-sectional width of the groove, and the groove is combined with the through hole to form a stepped accommodating space.

2. The support layer according to claim 1, wherein a central axis of the groove coincides with a central axis of the through hole.

3. The support layer according to claim 1, wherein as N is a positive integer greater than 1, cross-sectional widths of through holes in the second steel sheet layers gradually increase in a direction away from the groove.

4. The support layer according to claim 1, wherein a thickness of the support layer is greater than or equal to 100 micrometers and less than or equal to 200 micrometers.

5. The support layer according to claim 4, wherein a thickness of the first steel sheet layer and any of the second steel sheet layers is greater than or equal to 5 micrometers and less than or equal to 50 micrometers.

6. The support layer according to claim 1, wherein a longitudinal cross-sectional shape of the groove is rectangular, trapezoidal, semi-rounded rectangular, semi-circular or semi-elliptical, and a cross-sectional width of a bottom of the groove is less than or equal to a cross-sectional width of a top of the groove.

7. The support layer according to claim 1, wherein a longitudinal cross-sectional shape of the through hole is rectangular, trapezoidal or semi-rounded rectangular, and a cross-sectional width of a side of the through hole close to the groove is less than or equal to a cross-sectional width of a side of the through hole away from the groove.

8. The support layer according to claim 1, wherein both the groove and the through hole are provided with a filling layer, and a material of the filling layer is thermoplastic polyurethane elastomer rubber or solid rubber.

9. A flexible display module, comprising:

a display panel, comprising a bending area and a non-bending area located on both sides of the bending area;

a support layer, arranged on an opposite side of a display surface of the display panel, and the support layer comprising a first steel sheet layer and N second steel sheet layers laminated on one surface of the first steel sheet layer, wherein N is a positive integer, and a groove is provided on the surface of the first steel sheet layer facing the second steel sheet layers, a part of any of the second steel sheet layers corresponding to the groove is provided with a through hole, a cross-sectional width of the through hole is greater than a cross-sectional width of the groove, and the groove is combined with the through hole to form a stepped accommodating space;

wherein the groove of the support layer is arranged corresponding to the bending area, and an opening direction of the groove is consistent with a bending direction of the flexible display module.

10. The flexible display module according to claim 9, wherein a cross-sectional width of the through hole in the second steel sheet layer close to the bending direction of the flexible display module in the support layer is equal to a cross-sectional width of the bending area.

11. The flexible display module according to claim 9, wherein a central axis of the groove, a central axis of the through hole and a central axis of the bending area coincide.

12. The flexible display module according to claim 9, wherein as N is a positive integer greater than 1, cross-sectional widths of through holes in the second steel sheet layers gradually increase in a direction away from the groove.

13. The flexible display module according to claim 9, wherein a thickness of the support layer is greater than or equal to 100 micrometers and less than or equal to 200 micrometers.

14. The flexible display module according to claim 13, wherein a thickness of the first steel sheet layer and any of the second steel sheet layers is greater than or equal to 5 micrometers and less than or equal to 50 micrometers.

15. The flexible display module according to claim 9, wherein a longitudinal cross-sectional shape of the groove is rectangular, trapezoidal, semi-rounded rectangular, semi-circular or semi-elliptical, and a cross-sectional width of a bottom of the groove is less than or equal to a cross-sectional width of a top of the groove.

16. The flexible display module according to claim 9, wherein a longitudinal cross-sectional shape of the through hole is rectangular, trapezoidal or semi-rounded rectangular, and a cross-sectional width of a side of the through hole close to the groove is less than or equal to a cross-sectional width of a side of the through hole away from the groove.

17. The flexible display module according to claim 9, wherein both the groove and the through hole are provided with a filling layer, and a material of the filling layer is thermoplastic polyurethane elastomer rubber or solid rubber.

18. A flexible display device, comprising a driving chip and a flexible display module, and wherein the flexible display module comprises a display panel and a support layer, and the display panel comprises a bending area and a non-bending area located on both sides of the bending area, and the support layer is arranged on an opposite side of a display surface of the display panel, and the support layer comprises a first steel sheet layer and N second steel sheet layers laminated on one surface of the first steel sheet layer, N is a positive integer, and a groove is provided on the surface of the first steel sheet layer facing the second steel sheet layers, and a part of any of the second steel sheet layers corresponding to the groove is provided with a through hole, a cross-sectional width of the through hole is greater than a cross-sectional width of the groove, and the groove is combined with the through hole to form a stepped accommodating space;

wherein the groove of the support layer is arranged corresponding to the bending area, and an opening direction of the groove is consistent with a bending direction of the flexible display module.

19. The flexible display device according to claim 18, wherein a central axis of the groove, a central axis of the through hole and a central axis of the bending area coincide.

20. The flexible display device according to claim 18, wherein as N is a positive integer greater than 1, cross-sectional widths of through holes in the second steel sheet layers gradually increase in a direction away from the groove.

* * * * *